(12) United States Patent
Kisenwether

(10) Patent No.: US 8,146,844 B2
(45) Date of Patent: Apr. 3, 2012

(54) MINI BIG BALE VEGETATION SHREDDING AND DISPERSAL APPARATUS

(76) Inventor: David Kisenwether, Sugarloaf, PA (US)

( * ) Notice: Subject to any disclaimer, the term of this patent is extended or adjusted under 35 U.S.C. 154(b) by 232 days.

(21) Appl. No.: 12/701,570

(22) Filed: Feb. 7, 2010

(65) Prior Publication Data

US 2011/0192924 A1 Aug. 11, 2011

(51) Int. Cl.
*B02C 19/00* (2006.01)
(52) U.S. Cl. ........................ 241/60; 241/101.77; 241/605
(58) Field of Classification Search .................... 241/60, 241/101.77, 101.763, 101.762, 605
See application file for complete search history.

(56) References Cited

U.S. PATENT DOCUMENTS

| | | | | |
|---|---|---|---|---|
| 4,411,573 | A * | 10/1983 | Townsend | 414/24.6 |
| 4,597,703 | A * | 7/1986 | Bartolini | 414/24.6 |
| 4,923,128 | A * | 5/1990 | Ostrowski | 241/101.742 |
| 5,505,391 | A * | 4/1996 | Krueger et al. | 241/55 |
| 6,572,039 | B1 * | 6/2003 | Kruer et al. | 241/60 |
| 7,036,757 | B2 * | 5/2006 | Kisenwether | 241/186.35 |

* cited by examiner

*Primary Examiner* — Mark Rosenbaum
(74) *Attorney, Agent, or Firm* — Richard L. Bigelow

(57) ABSTRACT

The present invention is directed toward a reduced size vegetation shredding and dispersal apparatus that is capable of being attached to a skid steer front end loader (such as a Bobcat) that can be maneuvered into restricted areas and deliver shredded vegetation and mulch into recently seeded and landscaped areas. The apparatus comprises five major components: 1) a holding tray which is lined with a suitable plastic or other similar low coefficient of friction material to provide a consistent coefficient of friction; 2) two or more bale clamps which grasp the bale after the holding tray is placed over it; 3) a shredding conveyor wherein the bale comes into contact with a series of spikes on the conveyor; 4) a combination beater/blower shaft wherein the vegetation is further shredded and then directed through the blower out onto the surface to be covered; and (5) an integrating surface wherein the device is integrated into the quick disconnect, mounting plate for specialized attachments on the skid steer front end loaders. The interaction of these components as the device is operated is described in detail below. The holding tray and bale clamps are used so that the skid steer loader equipped with the present invention is self loading. The shredding conveyor then feeds pieces of the baled vegetation into the beater/blower apparatus. The beater/blower apparatus then continues to shred the vegetation and keep it suspended in the air that is being directed into the blower. The shredded mulch is then ejected from the blower and spread onto newly seeded areas to prevent ground erosion and to promote seed germination. A skid steer loader equipped with the present invention is more economically feasible for the smaller landscaping company that would like to utilize the labor saving large rectangular bales of vegetation.

20 Claims, 10 Drawing Sheets

MINI BIG BALE VEGETATION SHREDDING AND DISPERSAL APPARATUS

CROSS REFERENCE TO RELATED APPLICATIONS

None

FEDERAL RESEARCH STATEMENT

None

BACKGROUND OF THE INVENTION

The present invention relates to a reduced size apparatus and method for shredding and dispersing large rectangular bales of vegetation, including hay, straw or any other material suitable for mulch overlays in order to prevent the erosion of recently excavated soil and to expedite the germination of grass. More specifically, this invention is a self loading, hydraulically driven attachment for skid steer front end loaders that can accommodate and shred the labor saving, large rectangular bales of vegetation. Until now, large rectangular bale mulching and dispersal equipment such as those shown in the prior art have been much larger and, therefore, have represented a substantial investment for a landscaping company. This investment could only be made by larger landscaping companies that performed enough mulching jobs to justify the cost of the equipment. The present invention allows smaller landscaping companies to own or economically lease a skid steer front end loader which can now be adapted for mulch dispersal.

Skid steer front end loaders are sold by many of the larger equipment companies and have become very popular within the landscaping industry. They have become popular for two main reasons: (1) they are small enough to get into tight places and (2) they have an industry standard, quick disconnect, mounting plate for specialized attachments. Skid steer front end loaders also have an industry standard auxiliary hydraulic system interface built into them to drive any of the specialized attachments that would require power. By using specialized attachments skid steer loaders become very economical because one machine can perform many functions. Until now there have been no commercially available mulch shredding and dispersal attachments for skid steer front end loaders, let alone an attachment that can load a large rectangular bale onto itself and then shred and disperse it. A large rectangular bale shredding and dispersal attachment for the popular skid steer loaders will present a lucrative new opportunity for smaller landscaping companies.

Machines designed for the landscaping industry that shred, and disperse large, rectangular vegetation bales are common in the prior art. For example, U.S. Pat. Nos. 7,036,757 to the present inventor; 6,572,039 to Kruer; and 5,505,391 to Krueger all teach relatively large pieces of equipment that shred and disperse vegetation. All of these machines cited as prior art require a separate machine to pick up, move, and place the large rectangular bales. Also a common feature of the machines in the prior art is they all require their own engine to power them.

The present invention is capable of loading itself so a separate bale handling machine is not needed and since the present invention is powered by the auxiliary hydraulic system of the skid steer loader, a separate engine is not needed. It should also be noted that the skid steer loader equipped with the present invention requires only one person to operate. All the mechanisms noted in the prior art require a minimum of two people.

SUMMARY OF THE INVENTION

The present invention is directed toward a self loading, hydraulically driven attachment for skid steer front end loaders that can accommodate and shred the labor saving, large rectangular bales of vegetation. This instant apparatus comprises five major components: 1) a holding tray which is lined with a suitable plastic or other similar low coefficient of friction material to provide a consistent coefficient of friction; 2) two or more bale clamps which grasp the bale after the holding tray is placed over it; 3) a shredding conveyor wherein the bale comes into contact with a series of spikes on the conveyor; 4) a combination beater/blower shaft wherein the vegetation is further shredded and then directed through the blower out onto the surface to be covered; and (5) an integrating surface wherein the device is integrated into the quick disconnect, mounting plate for specialized attachments on the skid steer front end loaders. The interaction of these components as the device is operated is summarized below.

The person operating the skid steer loader moves the loader into position close to the bale. He or she then activates the controls to lower the holding tray onto the top of the bale. The bale clamps grasp the top of the bale. The bale clamps are hydraulically actuated to move together to fully engage and tighten their grip on the bale. The bale is then lifted and rotated vertically around a horizontal axis approximately 135 degrees into position over the skid steer loader operator's line of sight. In this position, the forces of gravity are holding the bale onto the holding tray and the operator can safely see to move the skid steer loader into the area where mulch is desired. The bale clamps are disengaged and the bale is allowed to slide gravitationally along the plastic coated holding tray toward the shredding mechanism. The bale then slides down the holding tray until the bottom end of the bale rests on the shredding conveyor. The combination beater/blower shaft begins rotating and then the shredding conveyor begins pushing chunks of the baled vegetation into the beater knives on the fan shaft. The beater knives finish the shredding of the mulch and also keep it suspended in the air. This mulch laden air is then atmospherically forced into the blower that then disperses the mulch on the ground.

Another key part of the instant invention is incorporation of the controls for the self loading, hydraulically driven attachment internal to the cab of the skid steer front loader. This allows for efficient single person operation of the device—a key element for small to medium sized landscaping and other similar businesses.

As used herein, the terms "straw" and "mulch" refer to any material that is suitable for providing adequate ground cover and soil erosion control, and specifically includes, but is not limited to hay, grass, stalks (such as corn stalks and bean stalks), and other forms of suitable mulching matter. Furthermore, the term "bale" refers to any substantially compacted and constrained (i.e. tied with string or twine) form of "straw" or "mulch" in a rectangular, cylindrical, or any other appropriate configuration.

Considering the limited horsepower available through the skid steer loaders auxiliary hydraulic system and the density and moisture inconsistencies of baled mulching material, blockages of mulch material in the present invention became a problem during development of the device. The speed of the shredding conveyor determines the rate at which mulch is moved through the present invention. Because density and moisture vary from bale to bale, the set speed of the shredding conveyor rarely matched the speed needed to effectively and efficiently accomplish shredding. When the conveyor moved too slowly, mulching material was not coming out fast enough and when the conveyor moved too fast, blockages of the mulch material would occur. It became obvious that a control circuit would have to be used in the hydraulic system to turn the shredding conveyor on and off as needed. To accomplish this, a pressure sensor measures the hydraulic pressure that is used to drive the beater/fan shaft. When the shredding conveyor begins to overfeed the beater/fan shaft, the hydraulic pressure that drives this shaft rises and the pressure sensor then sends a signal to an electric spool valve built into the hydraulic circuit that drives the shredding conveyor. This electric spool then releases the hydraulic pressure that drives the shredding conveyor and the shredding conveyor then stops. When the beater/fan shaft processes and blows out most of the mulch, the hydraulic pressure lowers and the pressure switch then closes the electric spool valve and the shredding conveyor resumes feeding mulch to the beater/fan shaft.

The three dimensional envelope of the present invention is approximately seven feet tall by three feet wide by three feet deep.

The essence of the present invention is to be large enough to accommodate and process large rectangular bales of hay while at the same time being small enough to allow it to be used with small skid steer front end loaders or other similar self propelled pieces of equipment.

While the concept of the instant invention is described in the context of an attachment for skid steer front end loaders, the same concept is also applicable to other small mobile self-propelled pieces of equipment.

BRIEF DESCRIPTION OF DRAWINGS

FIG. 1 also shows part of the clamps 50 that engage and hold the bale in place, the adaptor plate 40 which attaches to the quick disconnect mounting plate of the skid steer front end loader 100; the hydraulic unit 30 and the beater motor 60.

FIG. 5 is the holding tray 120, the hydraulic package 30 and the shredding apparatus 90.

FIG. 8 also shows the handles 170 which operate the tines (not shown) which lock the reverse J shape members 165 securely against the adapter plate of the mini big bale shredding and dispersal apparatus 10.

DETAILED DESCRIPTION OF THE INVENTION

The present invention is directed toward a reduced size vegetation shredding and dispersal apparatus that is capable of being attached to a skid steer front end loader (such as a Bobcat) that can be maneuvered into restricted areas and deliver shredded vegetation and mulch into recently seeded and landscaped areas. The apparatus comprises five major components: 1) a holding tray which is lined with a suitable plastic or other similar low coefficient of friction material to provide a consistent coefficient of friction; 2) two or more bale clamps which grasp the bale after the holding tray is placed over it; 3) a shredding conveyor wherein the bale comes into contact with a series of spikes on the conveyor; 4) a combination beater/blower shaft wherein the vegetation is further shredded and then directed through the blower out onto the surface to be covered; and (5) an integrating surface wherein the device is integrated into the quick disconnect, mounting plate for specialized attachments on the skid steer front end loaders. The interaction of these components as the device is operated is described in detail below.

Figure 1:
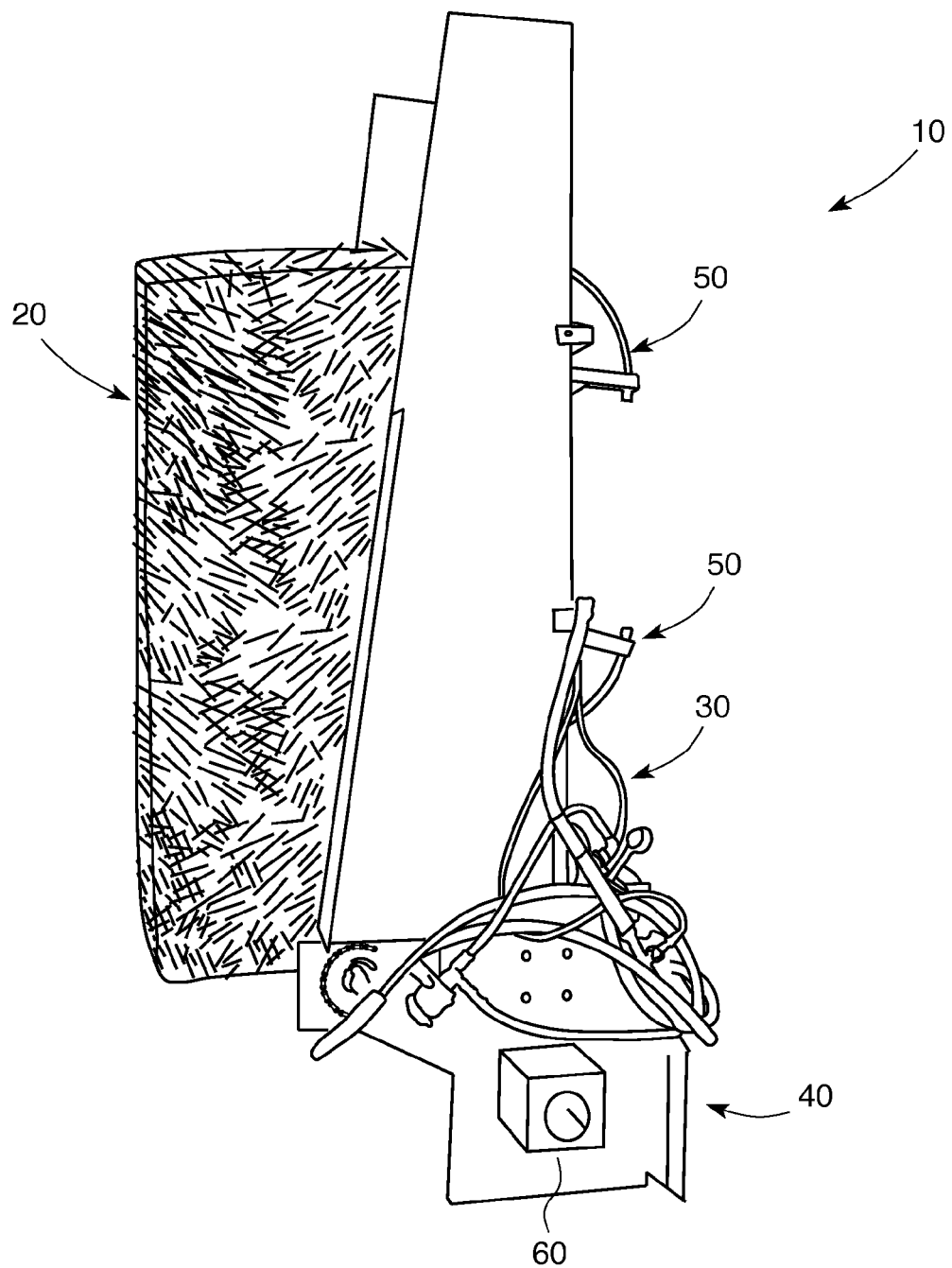
FIG. 1 shows the mini big bale mulching and dispersal apparatus 10 in the standalone and upright position with a large rectangular bale of hay 20 engaged.

Referring to FIG. 1, a side view of the instant invention 10 is shown. This view shows a rectangular bale of vegetation 20 being held in place in the reduced size big bale mulching apparatus 10. This view also shows part of the clamps 50 that engage and hold the bale in place, the face plate 40 which attaches to the universal adapter plate of the skid steer front end loader 100 (not shown); the hydraulic unit 30 and the beater motor 60.

Figure 2:
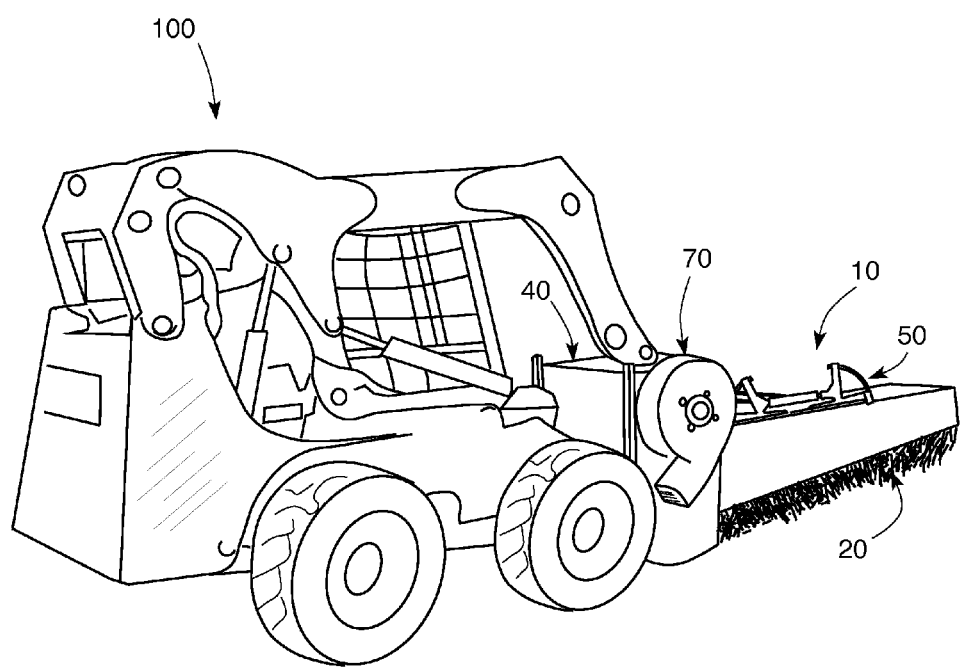
FIG. 2 shows a skid steer front end loader 100 attached to mini big bale shredder 10 as it is in position to pick up a bale of vegetation. This figure shows a better view of the clamps 50 and the manner in which the adaptor plate 40 of the device is attached to the quick disconnect mounting plate of the skid steer front end loader. It also shows the dispersal chute 70.

FIG. 2 shows the manner in which the self loading, hydraulically driven attachment engages a bale of vegetation 20. The skid steer front loader with the self loading, hydraulically driven attachment engaged maneuvers into position above a large rectangular bale of vegetation. The attachment is lowered onto the bale such that the holding tray on the inner part of the apparatus is positioned snuggly on top of bale. The operator then actuates the clamp mechanism such that the clamps move towards each other, thereby digging into and engaging the bale and holding the bale securely against the holding tray. Once the bale is securely attached to the holding tray, the bale can be elevated as shown in the FIG. 3.

FIG. 2 also shows the exhaust chute 70 through which shredded vegetation is directed onto the seeded or landscaped surface.

Figure 3:
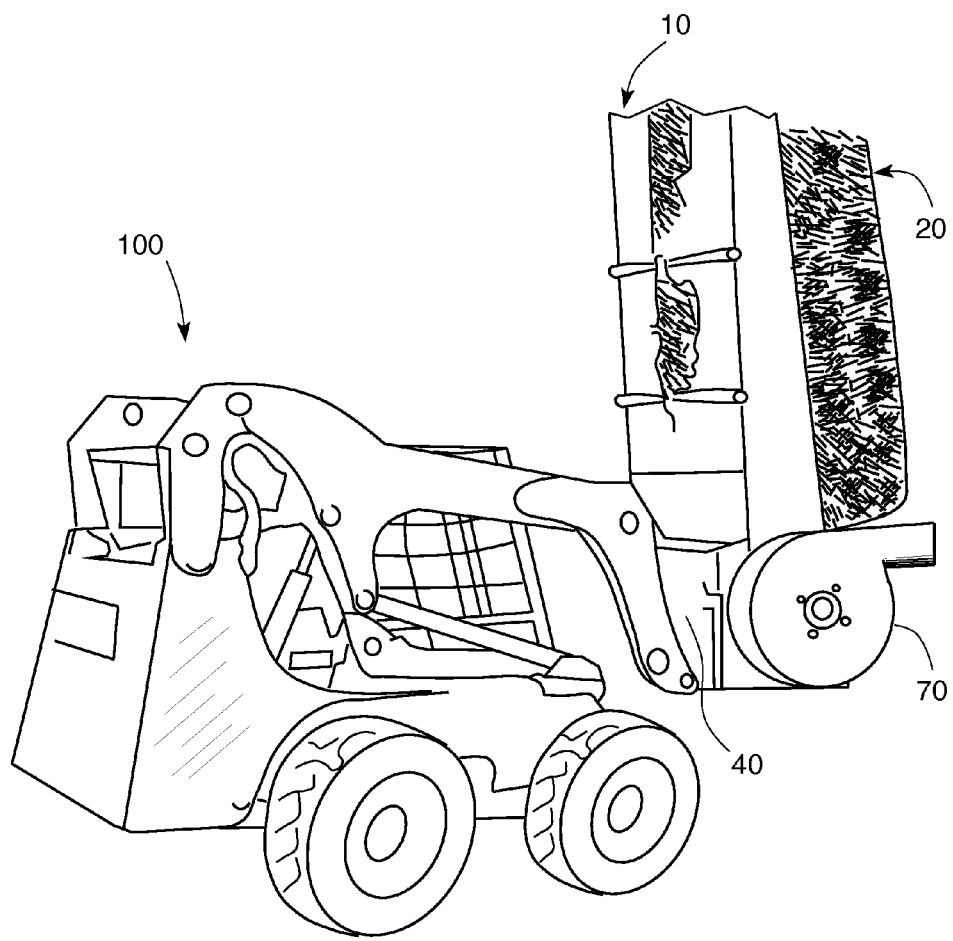
FIG. 3 shows the device 10 with a big bale of hay 20 loaded and in the 90 degree vertical position while attached to the quick disconnect mounting plate of the skid steer front end loader.

FIG. 3 shows the combined skid steer front loader—self loading, hydraulically driven attachment with the bale securely attached in approximately the ninety degree upright position. The combined self loading, hydraulically driven attachment/vegetation bale can be placed in other detents/inclinations anywhere from approximately forty-five degrees to approximately one hundred thirty-five degrees in order to facilitate maneuvering into restricted areas.

Figure 4:
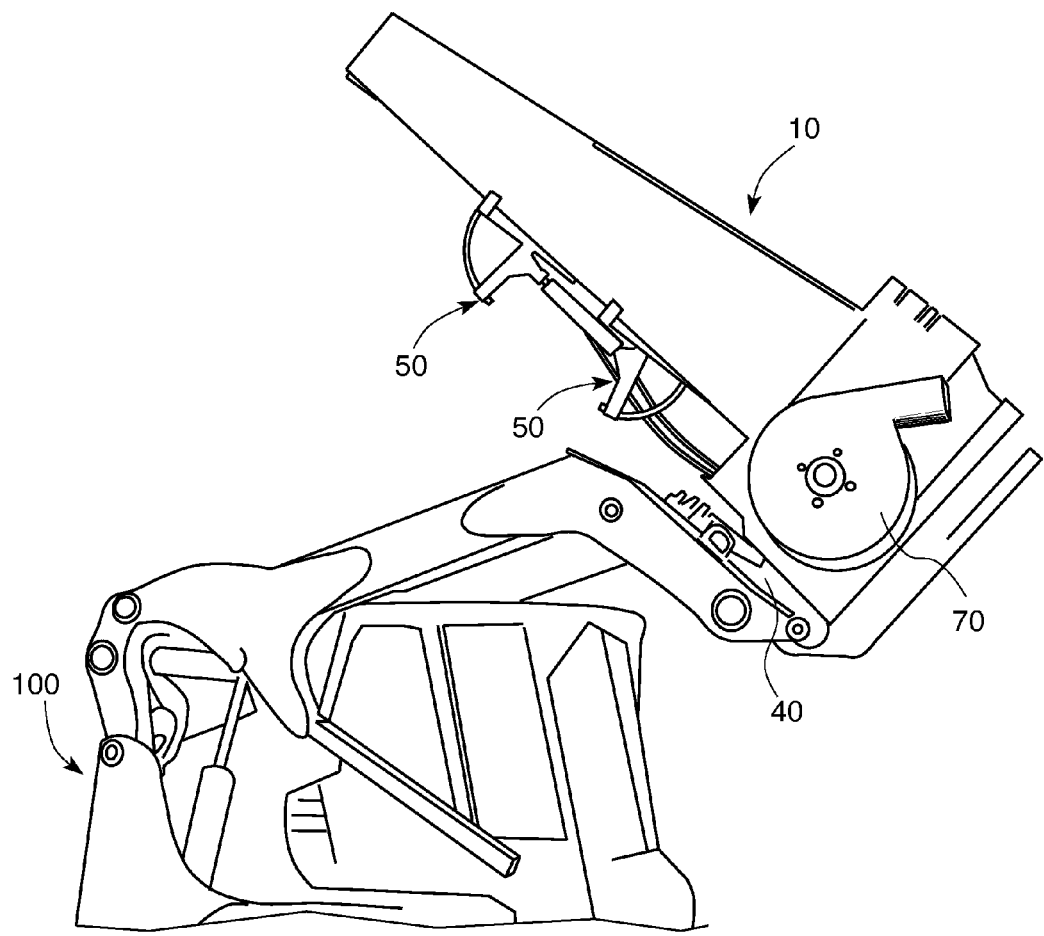
FIG. 4 shows the combined skid steer front end loader—mini big bale shredding apparatus with the device rotated to approximately 135 degrees which is the operational range for the device.

FIG. 4 is a closer view of the combined skid steer front loader—self loading, hydraulically driven attachment apparatus with the attachment in the approximately one hundred thirty five degree detent. This view presents a closer view of the clamping mechanism 50 and the two facing hooks that serve to grasp the vegetation bale and hold it firm to the holding tray as the attachment/bale mechanism is lifted and rotated to various detents above the horizontal. A closer view of the universal adapter plate 40 is also shown as is a closer view of the vegetation blower dispersal chute 70.

Figure 5:
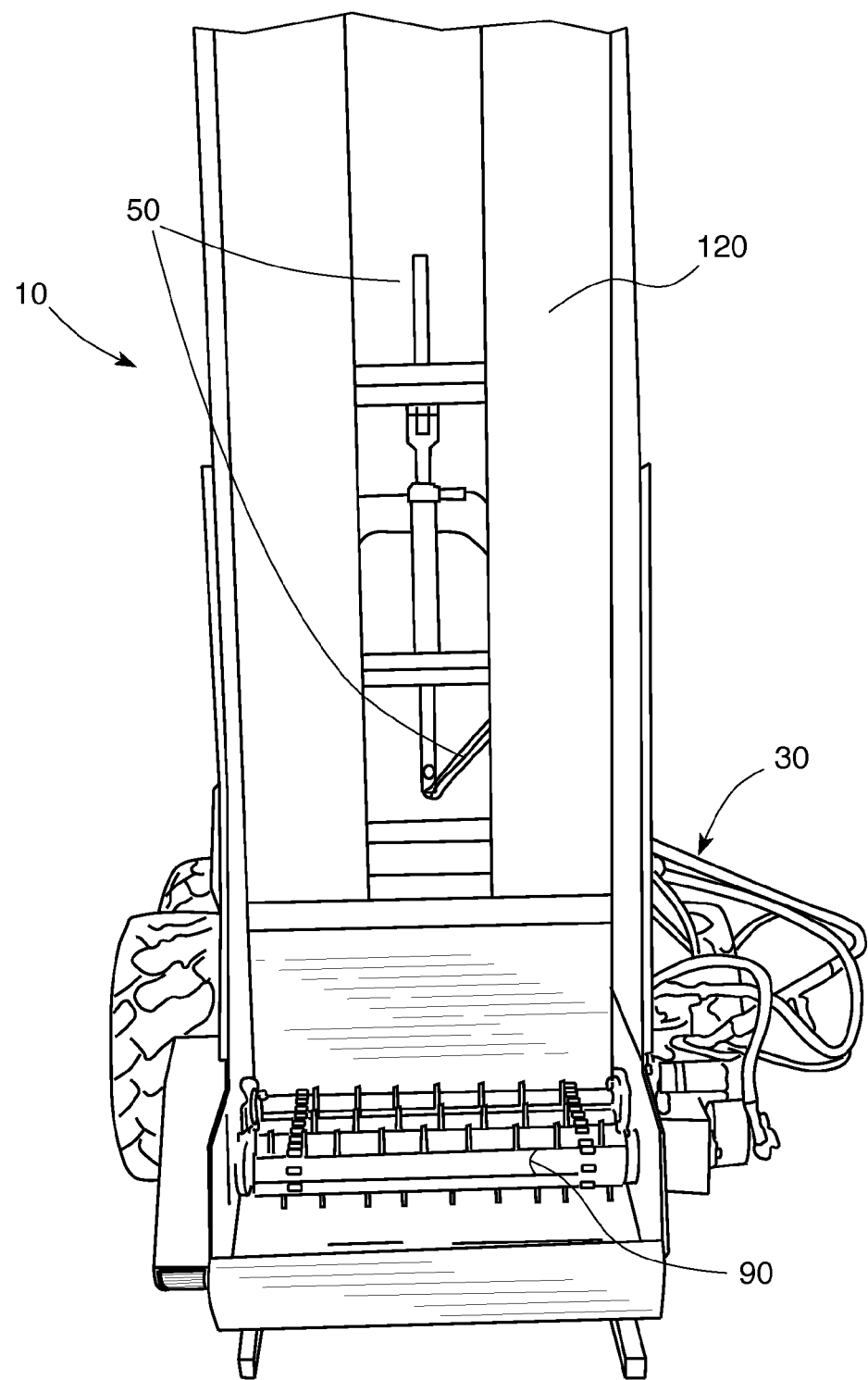
FIG. 5 shows the device in the upright position without a hay bale attached to it. Also shown in this

FIG. 5 is a front view of the self loading, hydraulically driven attachment which shows the holding tray 120. The holding tray is coated with plastic or other similar material in order to decrease the coefficient of friction between the bale and the metal plate of the holding tray. FIG. 5 also shows a front view of the clamping mechanism 50, the hydraulic unit package 30 and the shredding apparatus 90.

When considering FIGS. 1-5 together, the operation of the combined skid steer front loader—self loading, hydraulically driven attachment mechanism can be seen. As described above, the combined mechanism positions the attachment above a bale, lowers the holding mechanism onto the bale, engages the clamping mechanism such that the bale is securely attached to the holding tray, lifts the attachment and rotates it to the desired detent, maneuvers to the place where the shredded vegetation is to be disperses, engages the shredding apparatus 90, releases the clamping mechanism 50 thereby allowing the bale to slide by gravity into the shredding apparatus where the bale is shredded and fed into the dispersal chute 70 where it is blown onto the area that is to be landscaped or mulched.

Figure 6:
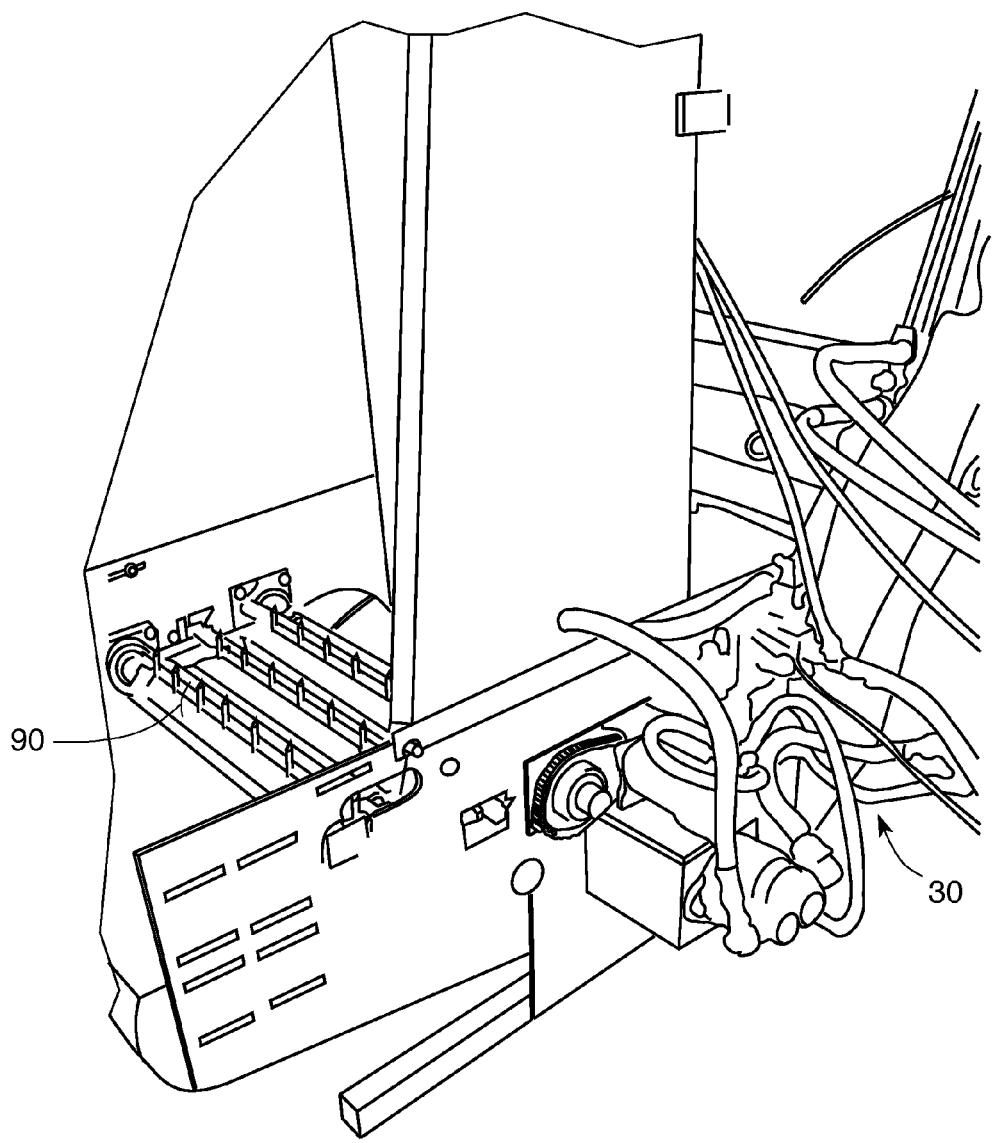
FIG. 6 shows a closer view of the hydraulic package 30 and the shredding mechanism 90.

FIG. 6 shows a close up perspective view of the lower part of the self loading, hydraulically driven attachment including the shredding apparatus 90 and the hydraulic unit package 30.

Figure 7:
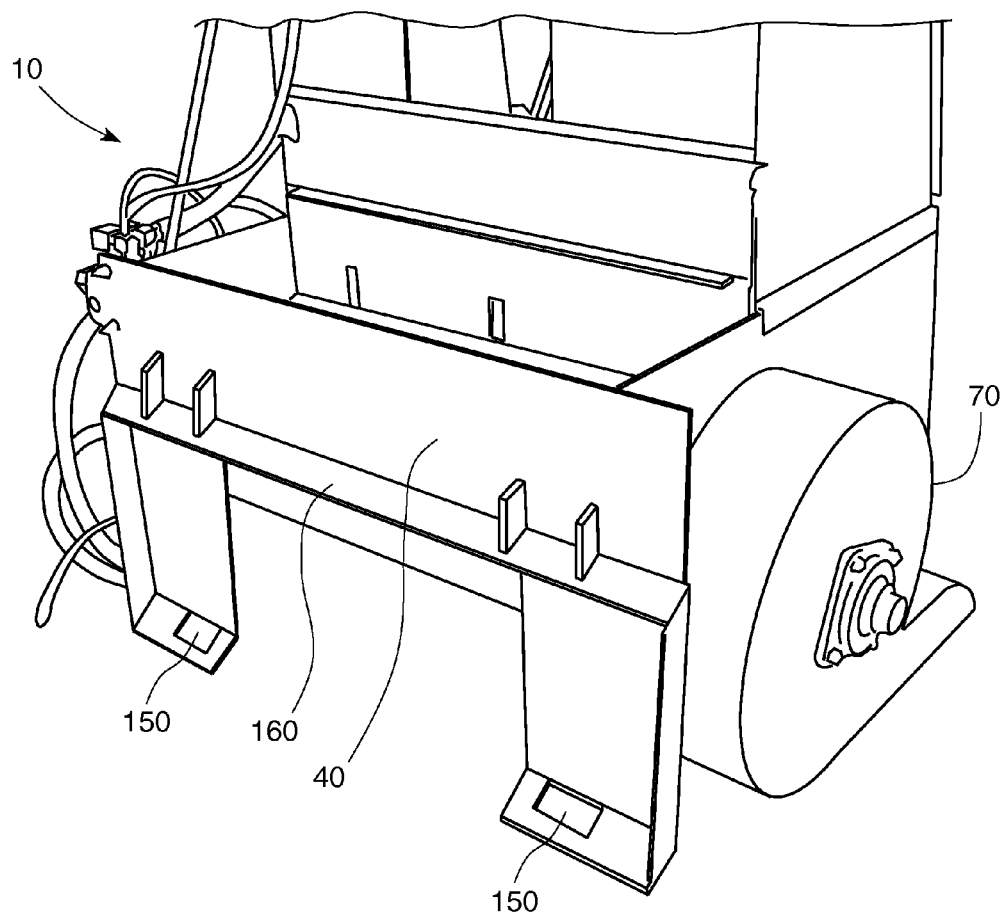
FIG. 7 shows the lower back end of the mini big bale shredding and dispersal apparatus 10 and in particular shows the adapter plate 40 to which the skid steer front end loader 100 is attached. Of particular importance in this FIG. 7 are the apertures 150 and the flange 160. The tines (not shown) of the skid steer front end loader go through the apertures 150 and lock the engaged reverse J shape members 165 into place against flange 160 to hold the combined apparatus firmly in place.

FIG. 7 shows another perspective view of the lower part of the self loading, hydraulically driven attachment including the adapter plate 40 which further comprises the flange 160 and openings 150 for the tines of the skid steer front loader.

Figure 8:
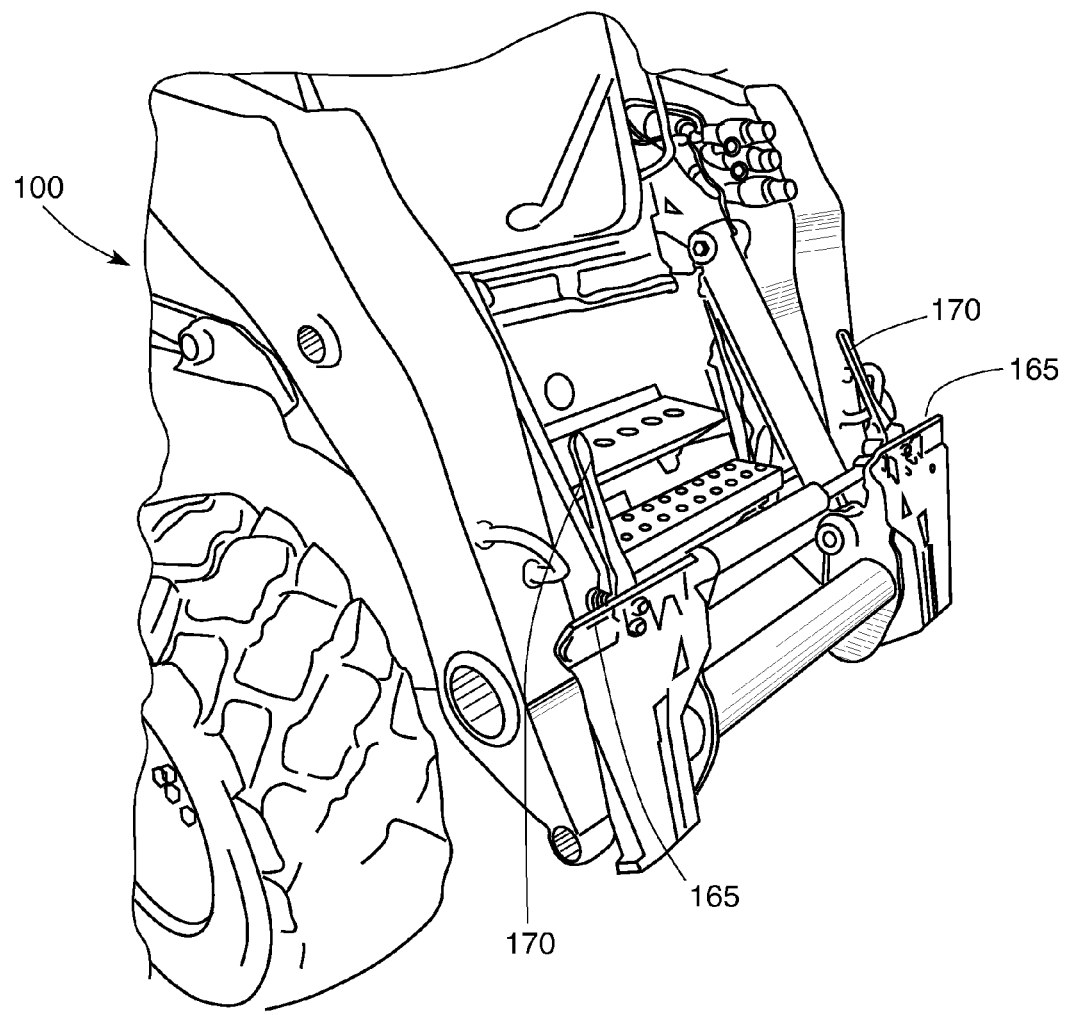
FIG. 8 shows the lower front end of the skid steer front end loader 100 and in particular shows the reverse J shape members that form the engagement edge 165 that engage the flange of the adapter plate 40 of the mini big bale shredding and dispersal apparatus.
Figure 9:
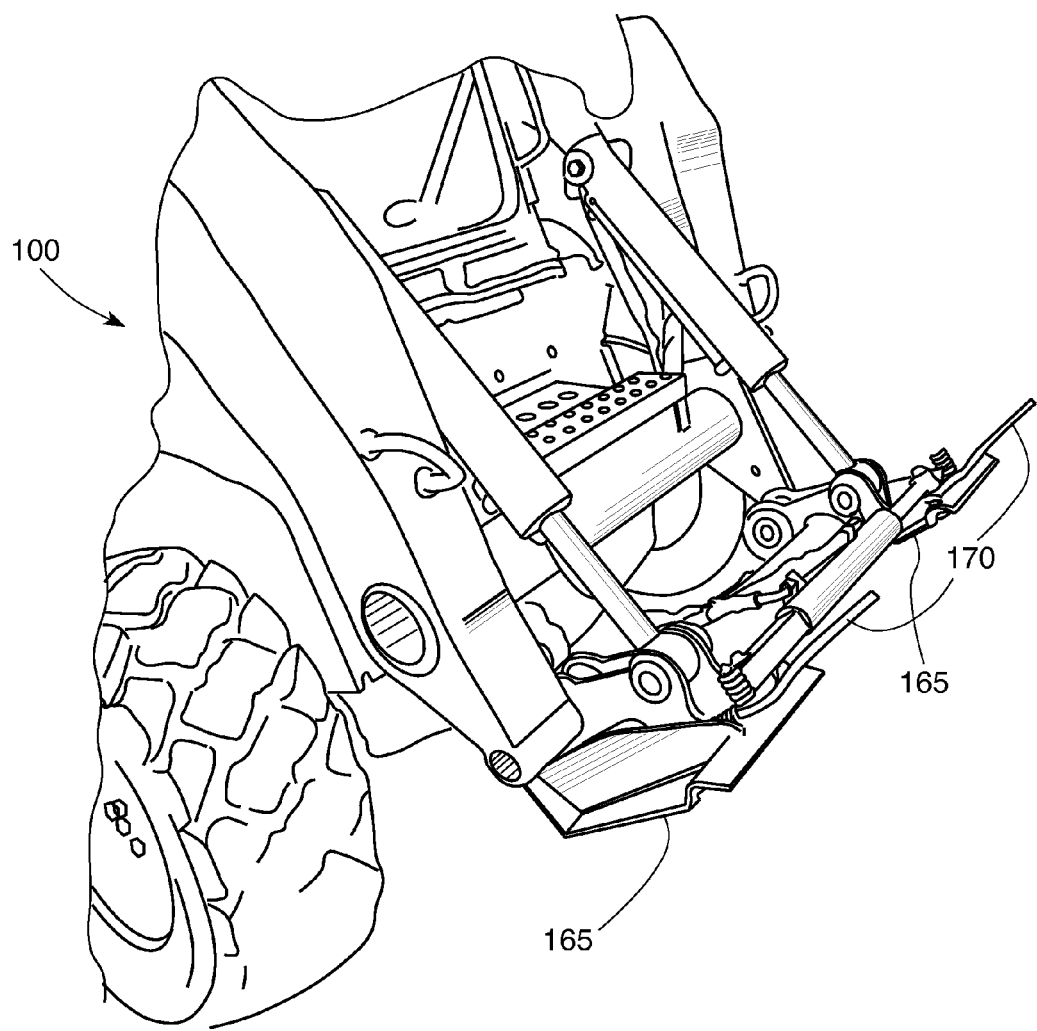
FIG. 9 shows the lower front end of the skid steer front end loader 100 in the deployed extended position.

FIGS. 8 & 9 show the industry standard adaptor plate that is used to engage the self loading, hydraulically driven attachment. In FIG. 9 the adaptor plate is rotated downward and the skid steer is maneuvered to insert the engagement edge 165 under the flange 160 shown in FIG. 7. The skid steer's adaptor plate is then rotated upward as shown in FIG. 8 and the engagement edge is then able to lift the mini big bale mulcher. To secure the mini big bale mulcher to the skid steer, tines (not shown) built into the skid steers adaptor plate are extended into openings 150 thereby locking the two components together.

Figure 10:
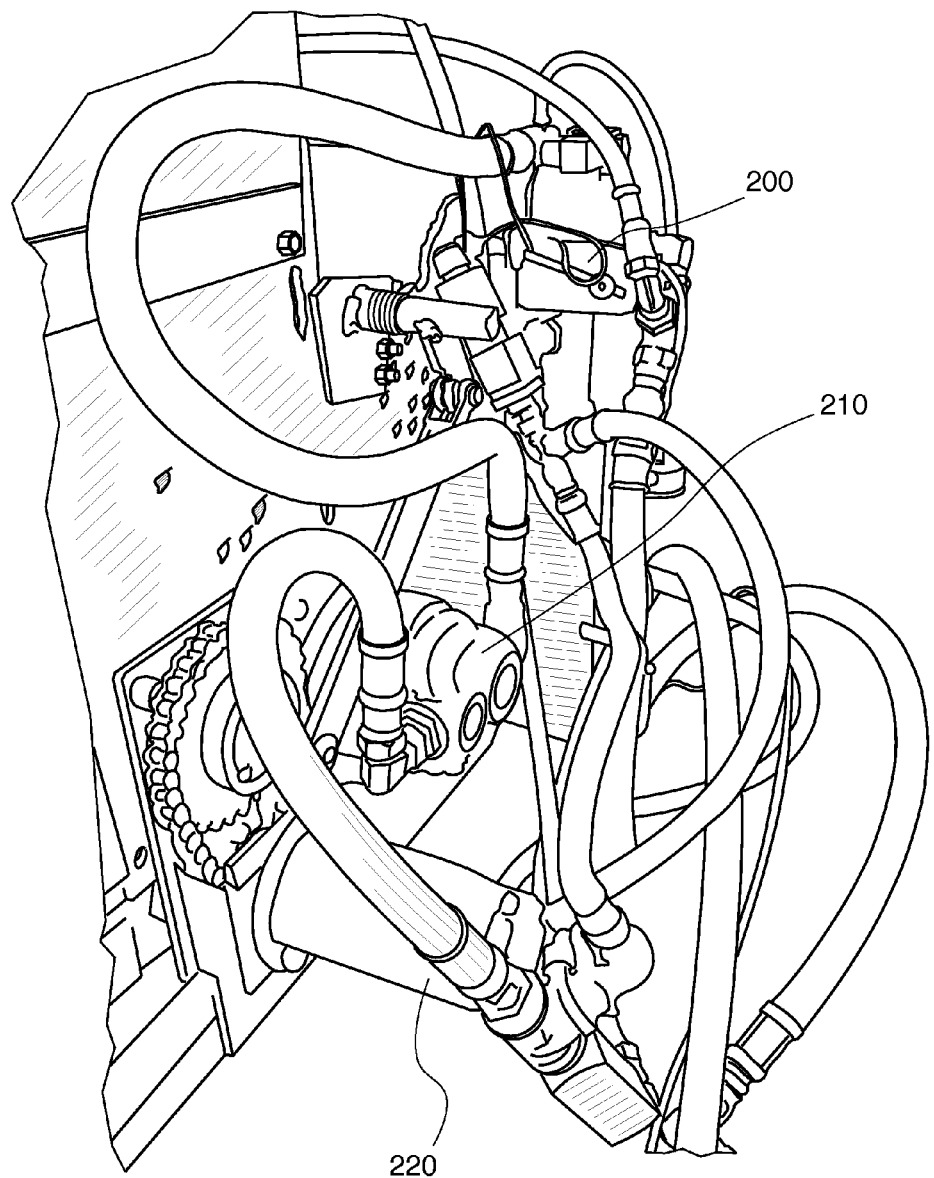
FIG. 10 shows a closeup of the motors and speed control that are an integral part of the mini big bale shredding and dispersal apparatus 10. In particular, this figure shows the speed control 200, the beater shaft hydraulic motor 210 and the shredding conveyor hydraulic motor 220.

FIG. 10 is a closeup of the motors and speed control that are an integral part of the mini big bale mulching and dispersal apparatus 10. In particular, this figure shows the speed control 200, the beater shaft hydraulic motor 210 and the shredding conveyor hydraulic motor 220. As described above, the bale is elevated and rotated to the desired detent, the clamping mechanism is released and the bale is then allowed to slide by gravity into the shredding conveyor wherein the bale comes into contact with a series of spikes on the conveyor. The spikes serve to break the bale into large chunks of vegetation. The large chunks of vegetation then proceed into the beater where the large chunks are further broken up into mulch. The mulch is then exhausted out the dispersal chute toward the area to be mulched.

BEST MODE FOR PRACTICING THE INVENTION

The best mode for practicing the invention is as follows: the self loading, hydraulically driven mini big bale mulcher (the apparatus) is attached to a skid steer front loader (such as a Bobcat). The apparatus is then moved into position by the skid steer front loader over a rectangular bale of vegetation. For ease in describing the best mode of the invention, the rectangular bale of vegetation will hereinafter be referred to a hay bale or bale. The skid steer front loader lowers the apparatus over and onto the top of the bale such that the holding tray is resting squarely on top of the bale. The operator then actuates the clamping mechanism on the top side of the apparatus. The "horns" of the clamping mechanism penetrate the bale and hold it securely to the holding tray on the underside of the apparatus.

Once the bale is held securely to the underside of the apparatus, the operator then lifts the bale off the ground and rotates the bale along a horizontal axis to a detent between approximately 45 degrees and one hundred thirty-five degrees. In this position, the bale is essentially resting on top of the holding tray. The apparatus loaded with the hay bale is then lifted above the operator's line of sight and the combined skid steer front loader—mulching apparatus is then moved to the area where mulching and dispersal of vegetation is desired. The shredding conveyor motor has a speed control to control the speed of the shredding conveyor in order to ensure that the device does not become clogged.

I claim the following:

1. A reduced size self loading, hydraulically driven attachment for skid steer front end loaders that can accommodate and shred large rectangular bales of vegetation comprising the following:
    a. a holding tray that can accommodate a large bale of vegetation;
    b. two or more bale clamps which grasp the bale after the holding tray is placed over the bale and hold the bale secure to the mulching apparatus;
    c. a shredding mechanism wherein the bale comes into contact with a series of spikes on the conveyor;
    d. a combination beater/blower shaft wherein the mulch is further shredded and then directed through the blower out onto the surface to be covered; and
    e. an integrating surface wherein the device is integrated into a quick disconnect, mounting plate for specialized attachments on the skid steer front end loaders;
    f. a set of controls that allows the operator to control the apparatus.

2. A self loading, hydraulically driven attachment as in claim 1 where the holding tray is lined with a suitable plastic to provide a consistent coefficient of friction.

3. A self loading, hydraulically driven attachment as in claim 1 where the bale clamps face each other.

4. A self loading, hydraulically driven attachment as in claim 1 where a control circuit regulates the output of the shredding conveyor.

5. A self loading, hydraulically driven attachment as in claim 1 where the holding tray is rotated around a horizontal axis up to 135 degrees from the horizontal position.

6. A self loading, hydraulically driven attachment as in claim 1 where the holding clamps are released and the bale is gravitationally fed into the shredding conveyor and then into the beater blower mechanism.

7. A self loading, hydraulically driven attachment as in claim 1 that is held and operated over the skid steer loader operator's line of sight.

8. A self loading, hydraulically driven attachment as in claim 1 where the controls are internal to the skid steer loader's cab.

9. A self loading, hydraulically driven attachment as in claim 1 where the envelope dimensions of the attachment are less than seven feet tall by three feet wide by three feet deep.

10. A self loading, hydraulically driven attachment as in claim 1 that can be operated by one person.

11. A reduced size self loading, hydraulically driven attachment for small mobile self-propelled pieces of equipment that can accommodate and shred large rectangular bales of vegetation comprising the following:
 a. a holding tray that can accommodate a large bale of vegetation;
 b. two or more bale clamps which grasp the bale after the holding tray is placed over the bale and hold the bale secure to the mulching apparatus;
 c. a shredding mechanism wherein the bale comes into contact with a series of spikes on the conveyor;
 d. a combination beater/blower shaft wherein the mulch is further shredded and then directed through the blower out onto the surface to be covered; and
 e. an integrating surface wherein the device is integrated into a mounting plate for specialized attachments on the small mobile self-propelled pieces of equipment;
 f. a set of controls that allows the operator to control the apparatus.

12. A self loading, hydraulically driven attachment as in claim 11 where the holding tray is lined with a suitable plastic to provide a consistent coefficient of friction.

13. A self loading, hydraulically driven attachment as in claim 11 where the bale clamps face each other.

14. A self loading, hydraulically driven attachment as in claim 11 where a control circuit regulates the output of the shredding conveyor.

15. A self loading, hydraulically driven attachment as in claim 11 where the holding tray is rotated around a horizontal axis up to 135 degrees from the horizontal position.

16. A self loading, hydraulically driven attachment as in claim 11 where the holding clamps are released and the bale is gravitationally fed into the shredding conveyor and then into the beater blower mechanism.

17. A self loading, hydraulically driven attachment as in claim 11 that is held and operated over the small mobile self-propelled pieces of equipment operator's line of sight.

18. A self loading, hydraulically driven attachment as in claim 11 where the controls are internal to the small mobile self-propelled equipment's cab.

19. A self loading, hydraulically driven attachment as in claim 11 where the envelope dimensions of the attachment are less than seven feet tall by three feet wide by three feet deep.

20. A self loading, hydraulically driven attachment as in claim 11 that can be operated by one person.

* * * * *